United States Patent [19]
Kondo et al.

[11] Patent Number: 5,207,513
[45] Date of Patent: May 4, 1993

[54] ROLLING BEARING WITH SOLID LUBRICANT

[75] Inventors: Hiromitsu Kondo; Takahiro Mizutani, both of Kuwana; Norihide Sato; Tasuku Sato, both of Mie, all of Japan

[73] Assignee: NTN Corporation, Osaka, Japan

[21] Appl. No.: 799,254

[22] Filed: Nov. 27, 1991

[30] Foreign Application Priority Data

Nov. 30, 1990 [JP] Japan .................. 3-196310
Jun. 7, 1991 [JP] Japan .................. 3-136084
Jul. 30, 1991 [JP] Japan .................. 3-190150

[51] Int. Cl.$^5$ ............................................. F16C 19/02
[52] U.S. Cl. .................. 384/492; 384/565; 384/908
[58] Field of Search ............... 384/492, 565, 569, 908, 384/513, 300

[56] References Cited

U.S. PATENT DOCUMENTS

| | | | |
|---|---|---|---|
| 4,674,164 | 6/1987 | McCloskey | 384/908 |
| 4,696,581 | 9/1987 | Tsushima et al. | 384/565 |
| 4,997,295 | 3/1991 | Saitou | 384/492 |
| 5,028,150 | 7/1991 | Kronenberger et al. | 384/492 |

*Primary Examiner*—Lenard A. Footland
*Attorney, Agent, or Firm*—Nikaido, Marmelstein, Murray & Oram

[57] ABSTRACT

The raceway surfaces of the inner and outer rings 1 and 2 and the surfaces of the rolling elements 3 are formed with lubricating films 1a, 2a and 3a of polytetrafluoroethylene having average molecular weight of not more than 5000 {PTFE (A)}. PTFE heretofore used for rolling bearings is a polymer having average molecular weight of more than $1 \times 10^5$ mostly $1 \times 10^6$–$1 \times 10^7$, but PTFE(A) is very low in shear strength and soft as compared with PTFE polymer.

7 Claims, 11 Drawing Sheets

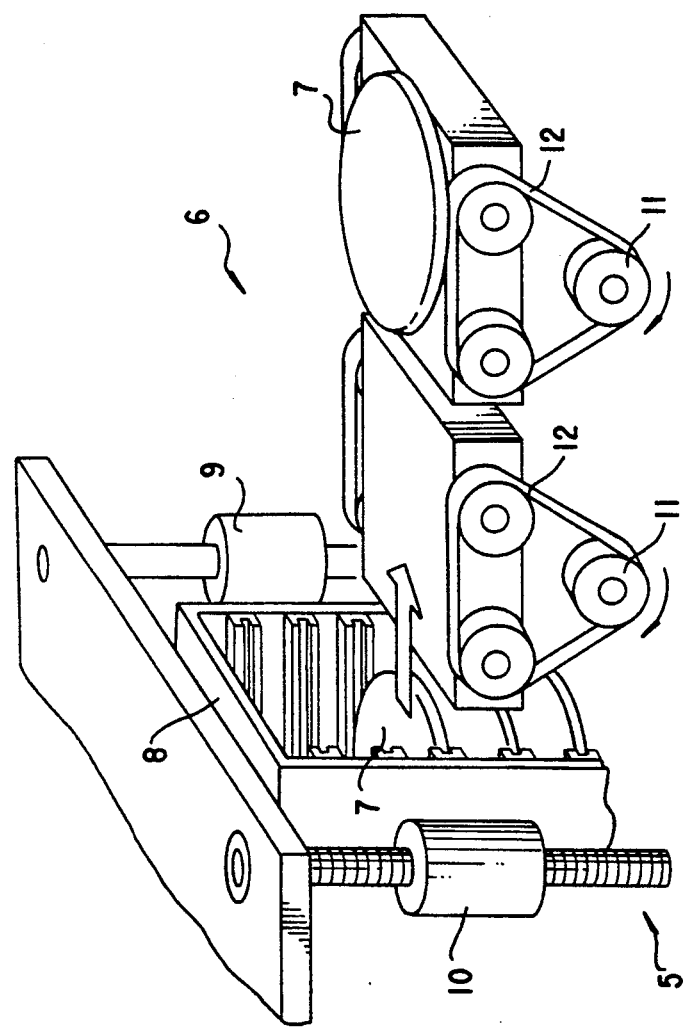

THE SCALE OF THIS FIGURE IS SET UP BY REGARDING THE LIFE OF THE CONVENTIONAL SOLID LUBRICATING BEARING AS 1.

THE SCALE OF THIS FIGURE IS SET UP BY REGARDING THE LIFE OF THE CONVENTIONAL SOLID LUBRICATING BEARING AS 1.

| LUBRICANT | DURABILITY | | DUST PRODUCING RATE | HEAT RESISTANCE | CORROSION RESISTANCE | COST PERFORMANCE | REFERENCE |
|---|---|---|---|---|---|---|---|
| | IN VACUUM | IN AIR | | | | | |
| PTFE (A) | ○ | ○ | ◎ | ◎ | ◎ | ◎ | LUBRICATING FILMS MAY BE FORMED ON THE SURFACE OF A FINISHED PRODUCTS. |
| Ag | ◎ | △ | ○ | ◎ | × | △ | LUBRICATING FILMS MUST BE FORMED ON THE SURFACES OF PARTS. |
| Pb | ◎ | △ | ○ | ◎ | × | △ | (THE SAME AS THE ABOVE) |
| MoS₂ | △ | △ | × | ◎ | × | △ | (THE SAME AS THE ABOVE) |

◎ SUPERIOR
○ AVERAGE
△ SLIGHTLY INFERIOR
× INFERIOR

FIG.8

ROLLING BEARING WITH SOLID LUBRICANT

BACKGROUND OF THE INVENTION

The present invention relates to a rolling bearing with solid lubricant used in a semiconductor producing apparatus.

Generally, in rolling bearings, a lubricant, such as grease, is fed between the inner and outer rings and between the rolling elements and the cage to decrease the rolling friction or sliding friction being subjected thereto so as to improve the durability of the bearing.

When a rolling bearing is to be used in vacuum requiring a high degree of cleanliness as in a semiconductor producing apparatus, the vapor of the lubricant becomes a source of contamination; thus, grease and other fluid lubricants cannot be used. Therefore, for a rolling bearing to be used in such environment, a solid lubricant having a low vapor pressure is required. At present, as to solid lubricants for rolling bearings, the laminar substance such as molybdenum disulfide, the soft metal such as gold, silver and lead, high polymer such as PTFE and polyimide are in wide use.

In recent years, in the semiconductor production field, as the degree of integration increases, the line width of electric circuits has been decreasing, and for fear that wear particles of the solid lubricant discharged from the bearing should short-circuit the electric circuit for its adhesion to the patterns, the trend is toward refraining from using solid lubricants of the soft metal type which are conductive. On the other hand, although solid lubricants, such as molybdenum disulfide and PTFE (polymer) are not conductive, they have low adherebility and low wear resistance; thus, they are inferior in durability to soft metals.

Further, in a recent semiconductor producing apparatus, not only a bearing which can be used in vacuum but also a bearing which can be used in both air and vacuum and which has a low dust producing rate and corrosion resistance has been called for. That is, it is mostly in the wafer treating process that vacuum bearings are used in the semiconductor producing process. The apparatus used in this process tends to be made in an in-line form; thus, the wafer conveyor requires a bearing to operate in both air and vacuum environments. Further, the high degree of integration of semiconductor necessarily requires suppressing the production of dust. Further, in some places where the apparatus is used, corrosion resistance and heat resistance are required.

Accordingly, an object of the present invention is to provide a rolling bearing with solid lubricant which is superior in durability when used both in air and in vacuum and which has a low dust producing rate and is suitable for use in the semiconductor producing field.

SUMMARY OF THE INVENTION

This invention is a rolling bearing with solid lubricant wherein at least a bearing part among bearing parts composing of the rolling bearing has a lubricating film on a surface of the bearing part being subjected to rolling friction or sliding friction, the lubricating film being formed of polytetrafluoroethylene having average molecular weight of not more than 5000.

Further, this invention is a rolling bearing with solid lubricant wherein at least surfaces being subjected to rolling friction or sliding friction among surfaces of bearing parts composing of the rolling bearing are formed with lubricating films of polytetrafluoroethylene whose average molecular weight is not more than 5000 (hereinafter referred to as PTFE(A)).

PTFE heretofore used for rolling bearings is a polymer whose average molecular weight is more than $1 \times 10^5$, mostly $1 \times 10^6 - 1 \times 10^7$, but PTFE(A) is very low in shear strength and soft as compared with PTFE polymer. For this reason, wear particles of PTFE(A) is superior in adherebility, capable of entering any shallow dimples in the mating surface to form a lubricating film thereon; thus, the wear particles hardly scatter, the dust producing rate being low. Further, because of the low shear resistance, the friction coefficient is also low, ensuring that an excellent lubricating performance is developed. Therefore, by using PTFE(A) to form a solid lubricating film on the region of a rolling bearing being subjected to rolling friction or sliding friction, the satisfactory adherebility and low friction coefficient ensure that a lubricating film having good lubricating performance is maintained for a long time. Further, the lubricating film of PTFE(A) has excellent durability not only in vacuum but also in air, and is very advantageous to a rolling bearing used in both vacuum and air such as a rolling bearing used in a wafer transporting system for transferring wafers between various manufacturing units and between clean rooms in a semiconductor producing apparatus.

As is clear from the above description, by using PTFE(A) as solid lubricant, a solid lubricating film is obtained which is nonconductive and which is superior in lubricity and durability. Therefore, a rolling bearing having solid lubricating films of this PTFE(A) formed on those surfaces being subjected to rolling friction or sliding friction has greatly increased durability as compared with that of such bearing using the conventional PTFE solid lubricant. Furthermore, solid lubricating films of PTFE(A) has such characteristics as (1) a low dust producing rate, (2) usability in both air and vacuum, (3) low torque (approximately equal to that of MoS$_2$ sputter films), (4) heat resistance (the softening point of the films is not less than 320° C.), and (5) corrosion resistance (the films are not corroded by acids or alkalis), so that when used for lubrication of rolling bearings which are used in the semiconductor production field, they develop remarkable effects.

BRIEF DESCRIPTION OF THE DRAWINGS

FIG. 2 shows a perspective view of a wafer transporting system used in a semiconductor producing apparatus.

FIG. 8 shows comparison of characteristics of various lubricating films.

DESCRIPTION OF THE PREFERRED EMBODIMENT

An embodiment of the present invention will now be described.

Figure 1A:
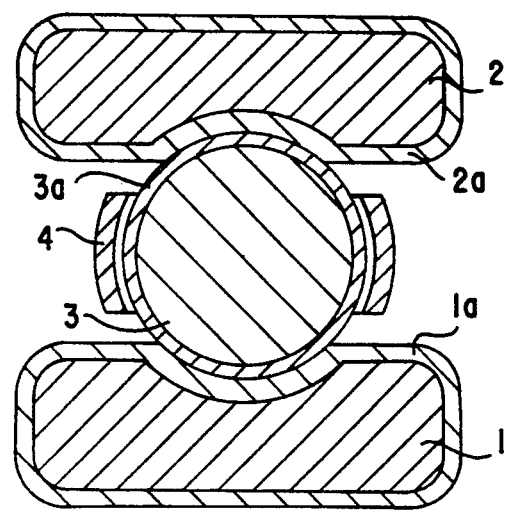
FIGS. 1A and 1B shows a cross sectional view of a deep groove ball bearing showing an embodiment of the present invention.

FIG. 1A shows an embodiment of the invention applied to a deep groove ball bearing. This deep groove ball bearing comprises bearing parts such as an inner ring 1, an outer ring 2, a plurality of rolling elements 3 interposed between the inner and outer rings 1 and 2, and a cage 4 for retaining the rolling elements 3 at equal circumferential intervals. And the raceway surfaces of the inner and outer rings 1 and 2 and the surfaces of the rolling elements 3 are formed with lubricating films 1a, 2a and 3a of PTFE(A) having average molecular weight of not more than 5000. These solid lubricating films 1a, 2a and 3a are formed by spraying PTFE(A) (ARC7 produced by Japan Acheson Ltd.) on the intended surfaces of the bearing parts for adhesion thereto from a position 25 cm away and holding the bearing parts in a constant-temperature oven taken at 300° C. (at least 150° C. is sufficient as the heat treating temperature) for 20 minutes for fusion-bonding to said intended surfaces.

The average film thickness in this case was 0.6 μm, but in the figure it is shown considerably exaggerated. The lubricating films 1a, 2a and 3a formed in this manner have high adhesion to the intended surfaces, prevented from being partly peeled from the intended surfaces, thereby exhibiting satisfactory lubricating performance for a long time. As for PTFE(A) which are materials for forming the lubricating films, besides said ARC7 it is possible to use VYDAX AR etc. produced by DU Pont and D-1 etc. produced by Central Grass Co., Ltd. As for methods of adhering films to the intended surfaces, besides said spraying process, it is possible to use immersion process, and the same effects can be obtained in each case.

Figure 1B:
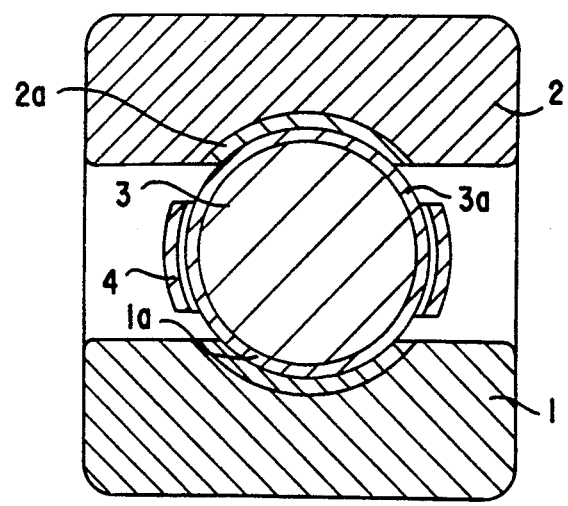

In addition, although the raceway surfaces of the inner and outer rings 1 and 2 and the surfaces of the rolling elements 3 have been shown formed with lubricating films in this embodiment, it is sufficient for the purpose to form solid lubricating films on the surfaces of the rolling elements 3 or on the raceway surfaces of the inner and outer rings 1 and 2. Further, in FIG. 1A, although surfaces of the inner and outer rings 1 and 2 have been shown formed in their entirety with lubricating films 1a and 2a, as shown by FIG. 1B, the portions not requiring solid lubricating films, such as fit surfaces, may be prevented from being formed with lubricating films by masking or such lubricating films formed thereon may be removed before finished products are obtained. Further, the invention is applicable not only to deep groove bearings as shown in FIGS. 1A and 1B but also to rolling bearings in general.

FIG. 2 shows a wafer transporting system used in a semiconductor producing apparatus. This wafer transporting system is used for transfer in general in the semiconductor producing process, such as transfer of wafers between production units and comprises a wafer lifting section 5 and a wafer transferring section 6. The wafer lifting section 5 drives cassette 8 storing wafers 7 by a ball screw 10 while guiding it by a linear ball bearing 9. When the cassette 8 is lifted to the same level as that of the wafer transferring section 6, a pusher (not shown) is actuated to push out the wafers 7 one by one onto the wafer transferring section 6. The wafers 7 successively pushed out onto the wafer transferring section 6 are transferred in the direction of arrow on belts 12 driven by drive rollers 11. The supporting shaft for the drive rollers 11, the supporting portion of the screw shaft for the ball screw 10 may use rolling bearings of the present invention. Also, surfaces of linear ball bearing 9 being subjected to rolling friction or sliding friction may be formed with lubricating films of PTFE(A).

Figure 3A:
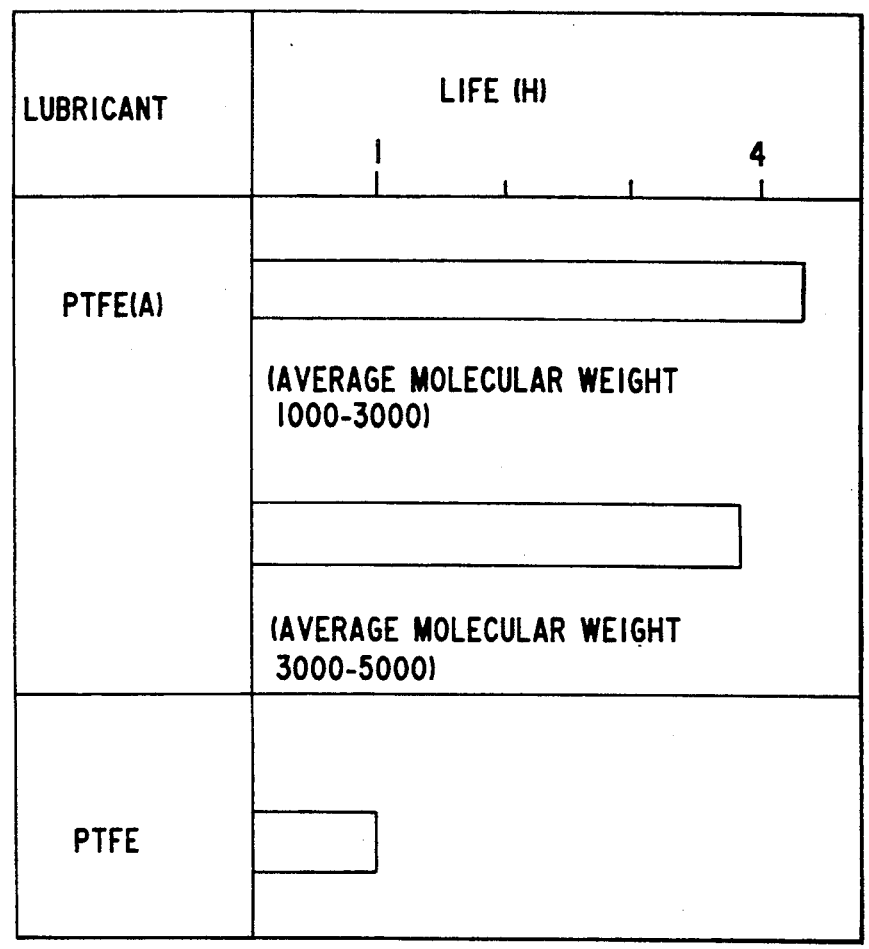
FIG. 3A shows the result of a endurance comparison test.

FIG. 3A shows the result of a endurance test conducted on rolling bearings of the arrangement shown in FIGS. 1A and 1B. The endurance test was conducted by rotating two test bearings under the conditions: room temperature, vacuum pressure below $10^{-6}$ Torr, a thrust load of 10N, and 2500 rpm, and the life was determined on the basis of the time when the sum of the friction torques of the two test bearings reached $10^{-2}$ Nm. As shown in the same figure, as compared with conventional rolling bearings with solid lubricant formed with lubricating films of PTFE polymer, the rolling bearings with solid lubricant of the present invention exhibited durability more than 4 times as high as the conventional value when they were formed with lubricating films having an average molecular weight of 1000–3000 and 3–4 times as high as the conventional value when they were formed with lubricating films having an average molecular weight of 3000–5000.

Figure 3B:
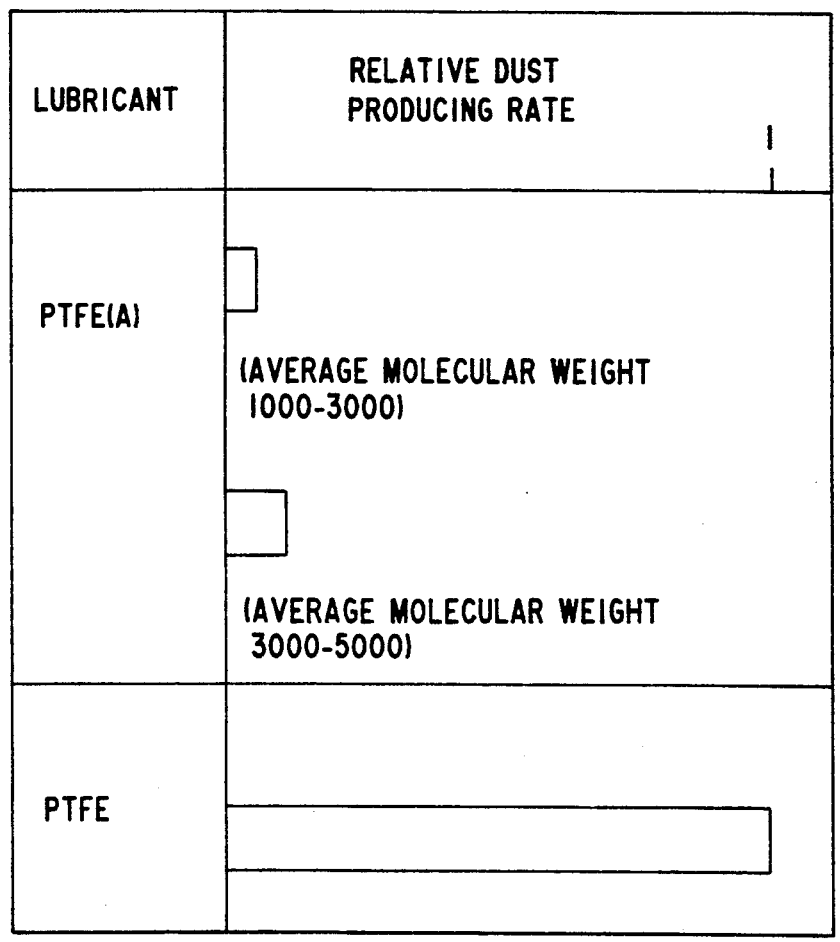
FIG. 3B shows the result of a dust measuring test.
Figure 4A:
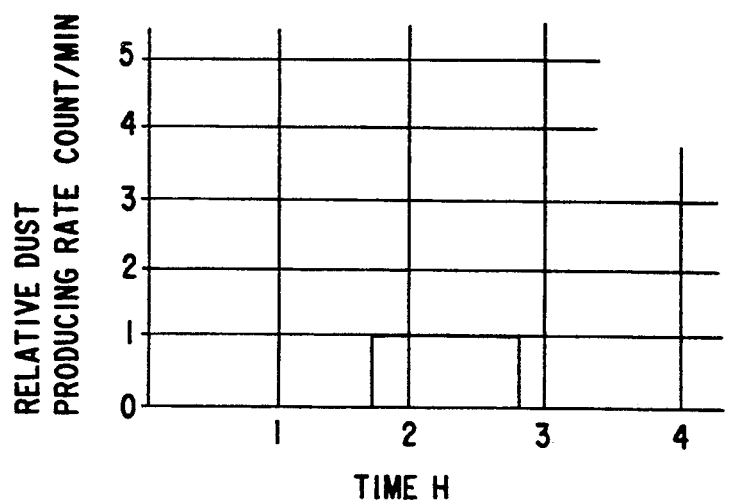
FIGS. 4 and 5 show time-dependent changes in dust producing rate.
Figure 4B:
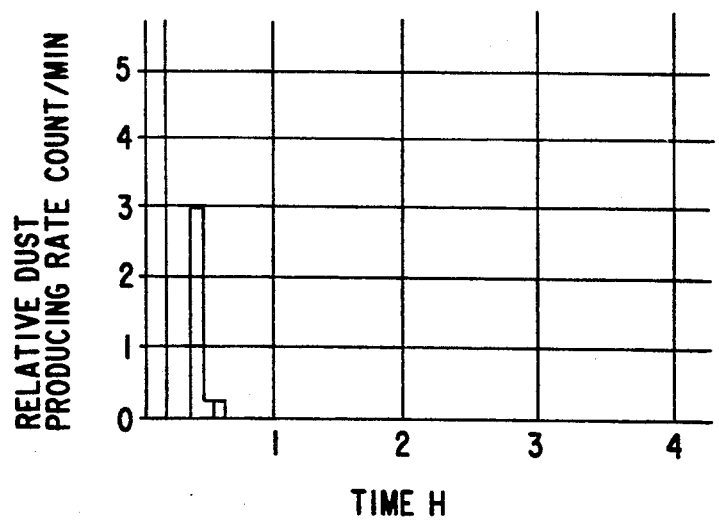
Figure 4C:
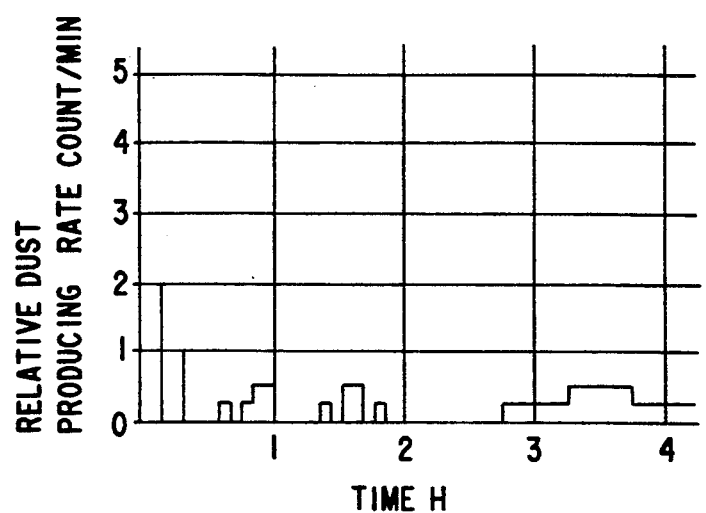
Figure 4D:
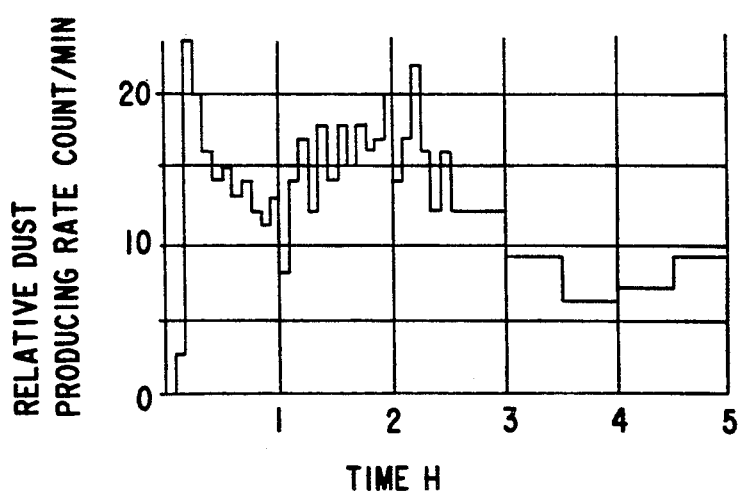
Figure 5A:
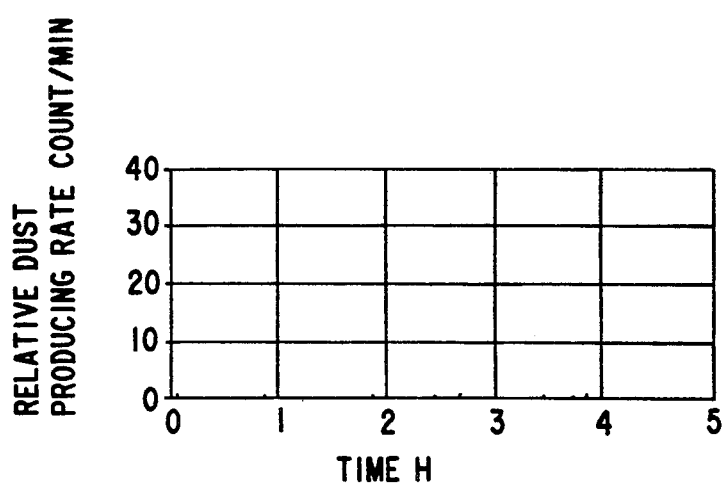
Figure 5C:
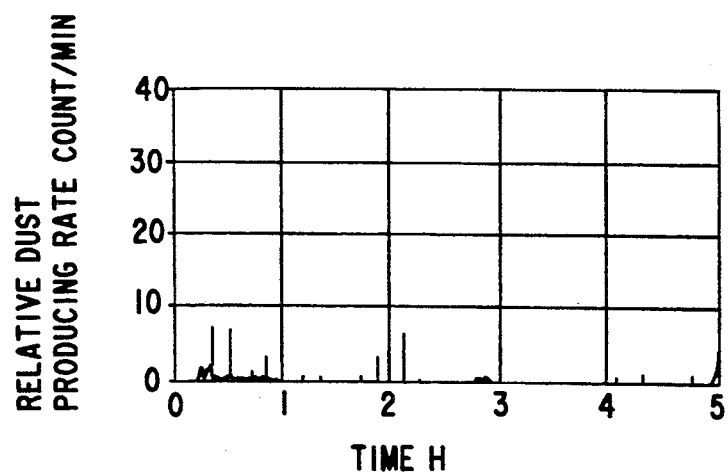
Figure 5D:
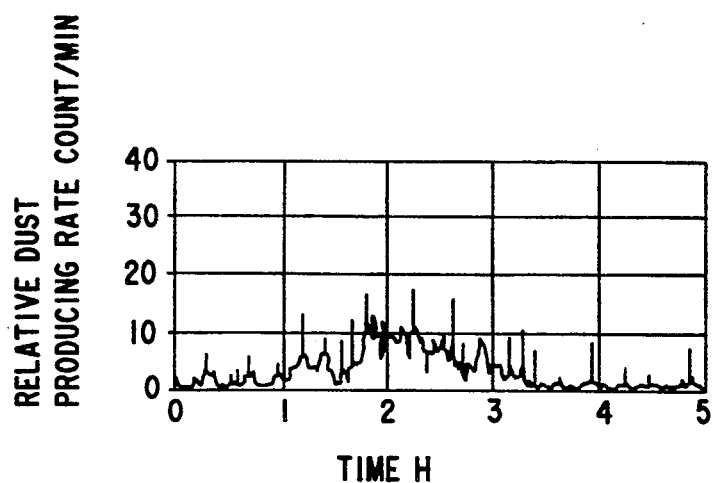
Figure 5E:
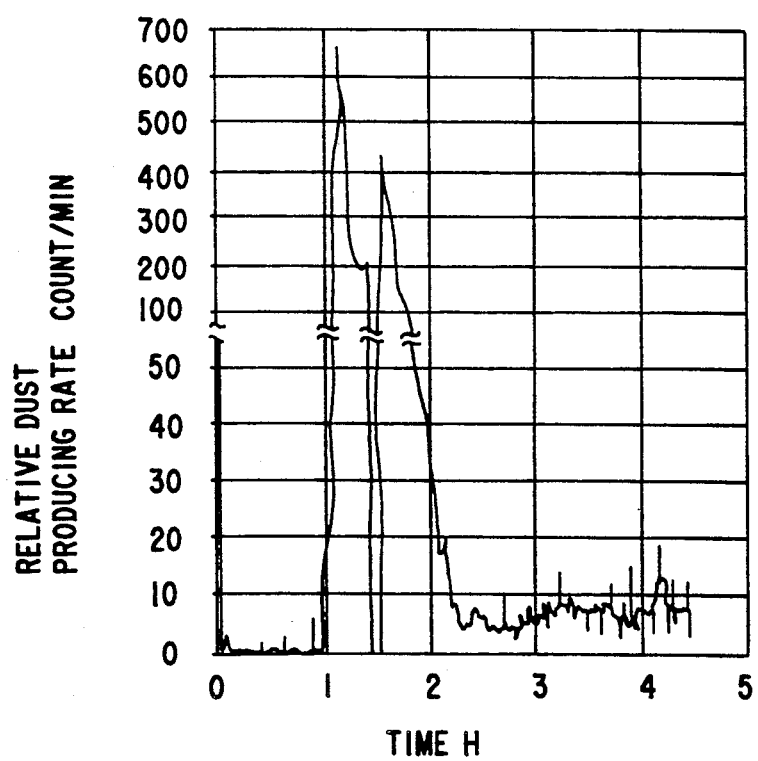

FIG. 3B shows the result of a dust measuring test conducted on rolling bearings of the arrangement shown in FIGS. 1A and 1B. The dust measuring test was conducted by rotating test bearings under the same conditions as those for the endurance test and detecting the amount of produced dust by a produced dust detector disposed immediately below the test bearings. As shown in the same figure, as compared with conventional rolling bearings with solid lubricant formed with lubricating films of PTFE polymer, the rolling bearings with solid lubricant of the present invention exhibited a dust producing rate which was about 1/100 of the conventional value when they were formed with lubricating films having an average molecular weight of 1000–3000 and a dust producing rate which was about 1/10 of the conventional value when they were formed with lubricating films having an average molecular weight of 3000–5000.

FIG. 4 shows the result of measurement of the dust producing rates of deep groove ball bearings formed with various lubricating films under the conditions: vacuum pressure below $10^{-6}$ Torr, 500 rpm, and a thrust load of 1.5N. Further, FIG. 5 is for comparison purposes, using 50 rpm and a thrust load of 10N approximating to the conditions for the wafer transfer apparatus. In these figures, the horizontal axis indicates time (h), the vertical axis indicates relative dust producing rate (count/min), and (A) indicates the case of a PTFE(A) film, (B) indicates the case of a Pb ion plating film, (C) indicates the case of an Ag ion plating film, (D) indicates the case of an $MoS_2$ sputtering film, and (E) indicates the case of an $MoS_2$ sintering film. In each case, the conditions other than rpm and thrust load are as follows: Test bearing: #608, inner and outer rings, steel balls: SUJ2 cage: SUS304, parts formed with films; inner and outer rings, steel balls, temperature; room temperature, measured dust particle diameter; >0.38 μm.

From the test results shown in FIGS. 4 and 5, it is seen that the film, particularly sintering film, of molybdenum disulfide has a high dust producing rate and that the dust producing rate successively decreases in the order of silver, lead and PTFE(A). It is believed that the lubricating film of PTFE(A), when subjected to a high shearing force on the slide surface of the bearing, does not become fine particles as molybdenum disulfide or soft metal dose, thereby holding down the production of dust into the outside of the bearing to almost zero. Further, even if the lubricating films are used for a long time, the dust producing rate never increases with the operating time.

Figure 6:
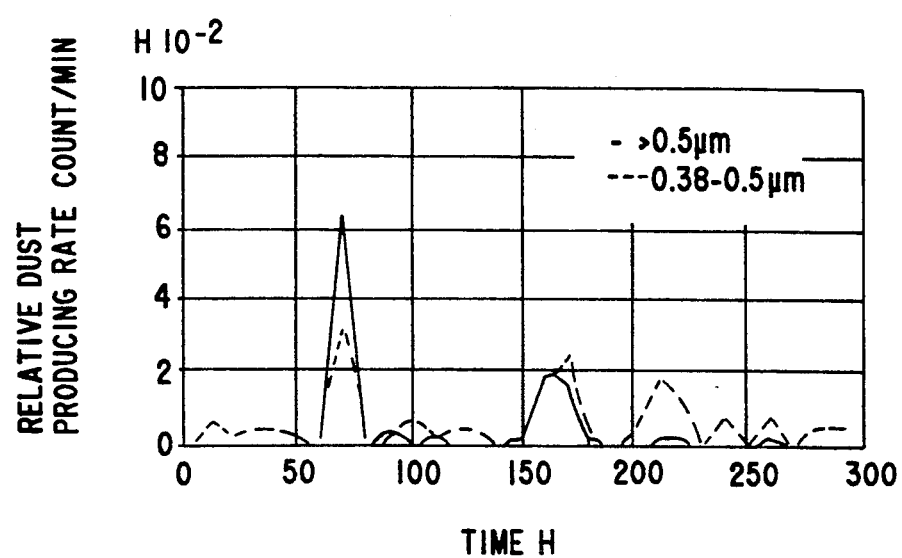
FIG. 6 shows time-dependent changes in dust producing rate for a long time.

FIG. 6 shows the result of long-hour measurement of rolling bearings formed with PTFE(A) films under the conditions shown in FIG. 5.

The durability of solid lubricating films largely depends on the atmosphere. Thus, ball bearings formed with various solid lubricating films were tested for their durability in vacuum and in air. The results are shown in FIG. 7.

Figure 7A:
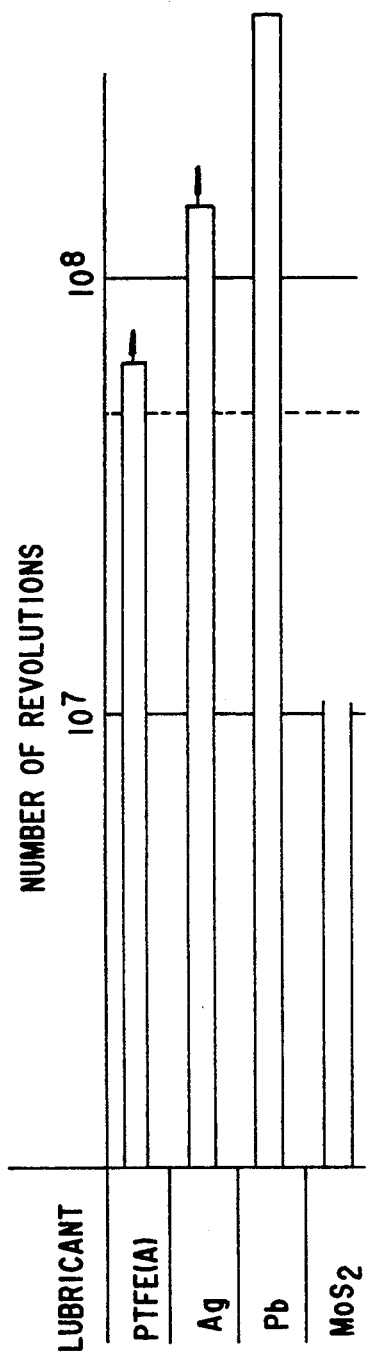
FIG. 7 shows the result of a comparison test concerning durability.
Figure 7B:
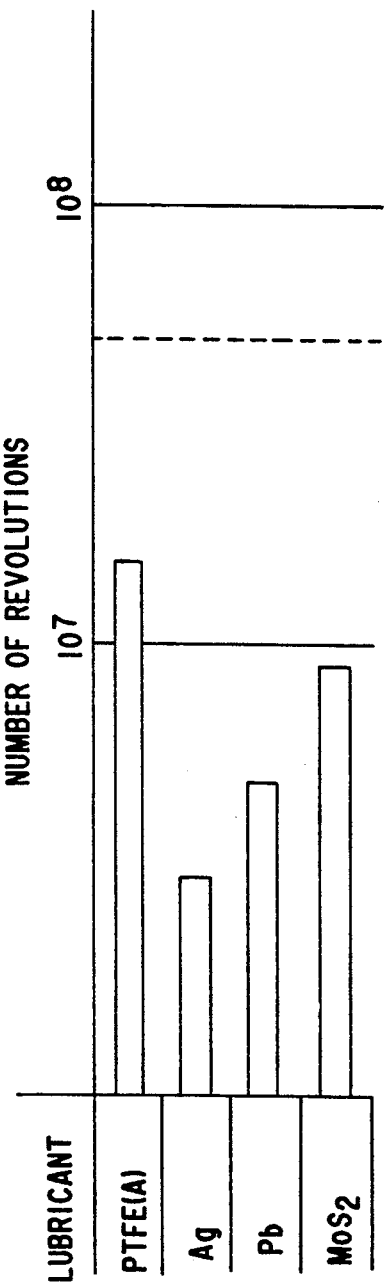

FIG. 7 (A) shows the result of a test made in vacuum (vacuum pressure $< 10^{-6}$ Torr) and FIG. 7 (B) shows the result of a test made in air. The test conditions are the same as those described with reference to FIG. 5, except that the rpm is 2500. Films of the metal such as silver and lead have a long life in vacuum but a short life in air. It seems that in air, the films react with oxygen to form oxides and become fine particles, so that their life is short as compared with their life in vacuum having little oxygen. Molybdenum disulfide films exhibite the durability which do not practically vary in both air and vacuum atmospheres. At present, in the case of use in both air and vacuum atmospheres, molybdenum disulfide films are often used, while PTFE(A) films have greater durability than that of molybdenum disulfide films in both air and vacuum atmospheres. Furthermore, when the problem of dust production comes out, the advantage of PTFE(A) films becomes more pronounced.

A semiconductor producing apparatus of the in-line type includes a process for etching $SiO_2$ using corrosive gas and an oxide film forming process. The gases used in these processes are dilute but highly corrosive. Corrosion resistance is naturally required of lubricating films and so is of the bearing materials. Therefore, it is preferable to use stainless steel balls and rings to form PTFE(A) films thereon.

Since the softening temperature of PTFE(A) is not less than 320° C., it is believed to be capable of withstanding the high temperature of about 300° C. which is required in a semiconductor producing apparatus.

The characteristics of the various lubricating films are summarized in FIG. 8. In the semiconductor producing apparatus, bearings for the transfer unit which uses many bearings are required to have a low dust producing rate and usability in both air and vacuum, as described above. The various lubricating films are compared with each other from this point of view and also from a viewpoint of mass productivity, it is seen that PTFE(A) film is the best.

What is claimed is:

1. A rolling bearing with solid lubricant wherein at least a bearing part among bearing parts composing of said rolling bearing has a lubricating film formed on a surface of said bearing part being subjected to rolling friction or sliding friction, said lubricating film being formed of polytetrafluoroethylene having average molecular weight of not more than 5000.

2. A rolling bearing with solid lubricant in claim 1 wherein each rolling element has said lubricating film.

3. A rolling bearing with solid lubricant in claim 1 wherein an inner ring and an outer ring have said lubricating films respectively.

4. A rolling bearing with solid lubricant for use in a semiconductor producing apparatus wherein at least a bearing part among bearing parts composing of said rolling bearing has a lubricating film formed on a surface of said bearing part being subjected to rolling friction or sliding friction, said lubricating film being formed of polytetrafluoroethylene having average molecular weight of not more than 5000.

5. A rolling bearing with solid lubricant in claim 4 wherein each rolling element has said lubricating film.

6. A rolling bearing with solid lubricant in claim 4 wherein an inner ring and an outer ring have said lubricating films respectively.

7. A rolling bearing with solid lubricant wherein at least surfaces being subjected to rolling friction or sliding friction among surfaces of bearing parts composing of said rolling bearing are formed with lubricating films of polytetrafluoroethylene whose average molecular weight is not more than 5000.

* * * * *